(12) United States Patent
Bernatchez et al.

(10) Patent No.: US 12,420,648 B2
(45) Date of Patent: Sep. 23, 2025

(54) ELECTRIC VEHICLE WITH WEAR MITIGATION

(71) Applicant: TAIGA MOTORS INC., Lasalle (CA)

(72) Inventors: Gabriel Bernatchez, Montreal (CA); Ivaylo Petkov, Montreal (CA); Maxence Scully, Montreal (CA); Cyrus Larsen, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 503 days.

(21) Appl. No.: 17/989,088

(22) Filed: Nov. 17, 2022

(65) Prior Publication Data
US 2023/0191922 A1 Jun. 22, 2023

Related U.S. Application Data

(60) Provisional application No. 63/292,645, filed on Dec. 22, 2021.

(51) Int. Cl.
*B60L 50/60* (2019.01)
*B62M 27/02* (2006.01)

(52) U.S. Cl.
CPC ............. *B60L 50/60* (2019.02); *B62M 27/02* (2013.01); *B60L 2200/00* (2013.01); *B60L 2240/14* (2013.01); *B60L 2240/423* (2013.01)

(58) Field of Classification Search
CPC .................................................. B60L 2200/00
See application file for complete search history.

(56) References Cited

U.S. PATENT DOCUMENTS

| | | | | |
|---|---|---|---|---|
| 7,771,312 B2* | 8/2010 | Sigmund | ............... | B60W 30/19 |
| | | | | 477/110 |
| 8,112,207 B2* | 2/2012 | Heap | ..................... | B60W 10/08 |
| | | | | 477/181 |
| 8,961,370 B2 | 2/2015 | Kida et al. | | |
| 9,163,567 B2 | 10/2015 | Kouda et al. | | |
| 9,902,390 B2 | 2/2018 | Hashimoto et al. | | |
| 10,040,439 B2 | 8/2018 | Choi et al. | | |
| 2005/0182546 A1 | 8/2005 | Hsieh et al. | | |
| 2016/0272188 A1* | 9/2016 | Bowman | ............... | B60W 20/10 |

* cited by examiner

*Primary Examiner* — Vicky A Johnson
(74) *Attorney, Agent, or Firm* — Norton Rose Fulbright Canada LLP

(57) ABSTRACT

Systems and methods for mitigating wear of electric vehicles are provided. A method of operating an electric powersport vehicle includes receiving an accelerator command and driving an electric motor of the vehicle based on whether or not the accelerator command is accompanied by a braking command. When the accelerator command exists at a same time as the braking command, the output of the electric motor is limited to a lower output torque value than when the accelerator command exists at a different time as the braking command.

20 Claims, 8 Drawing Sheets

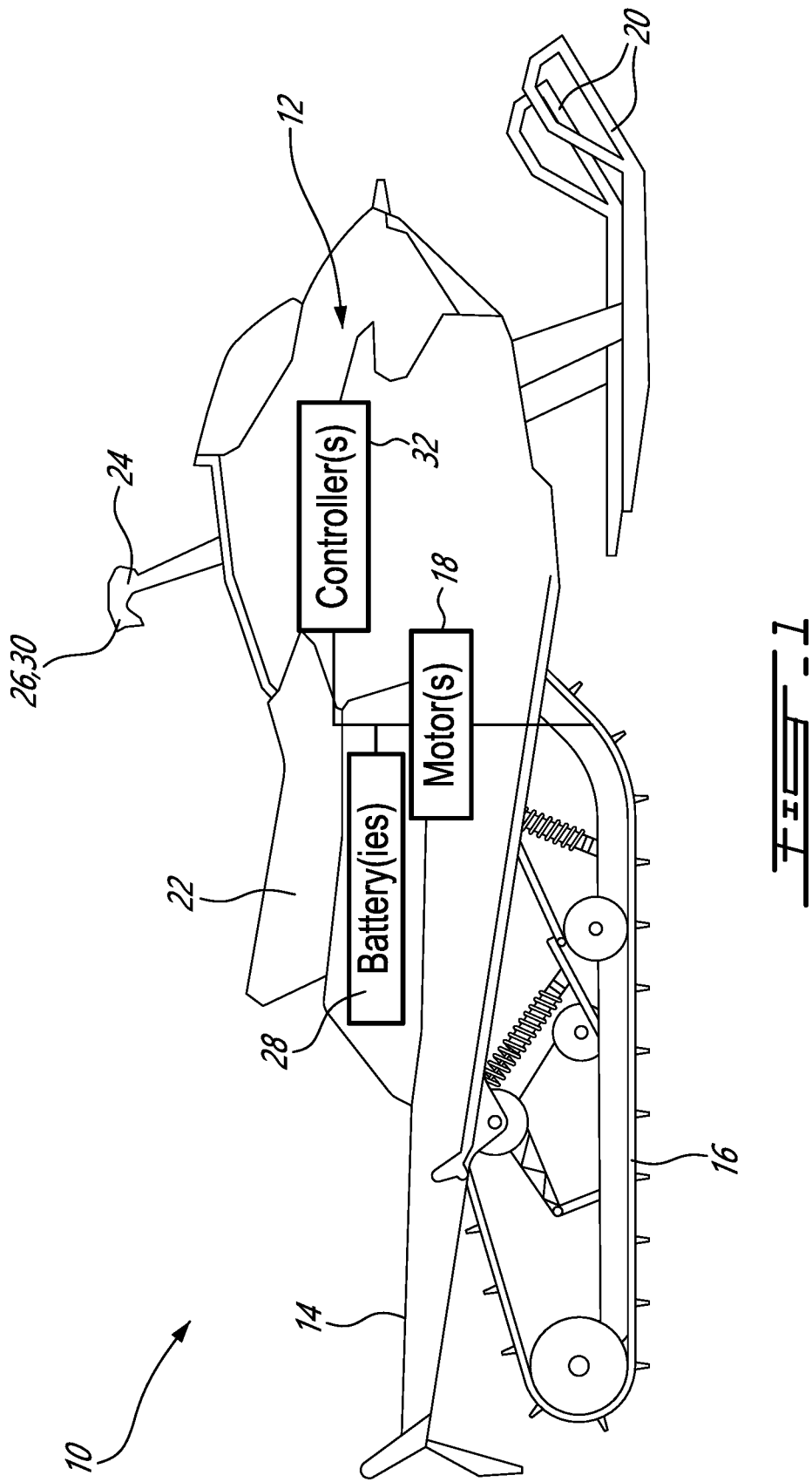

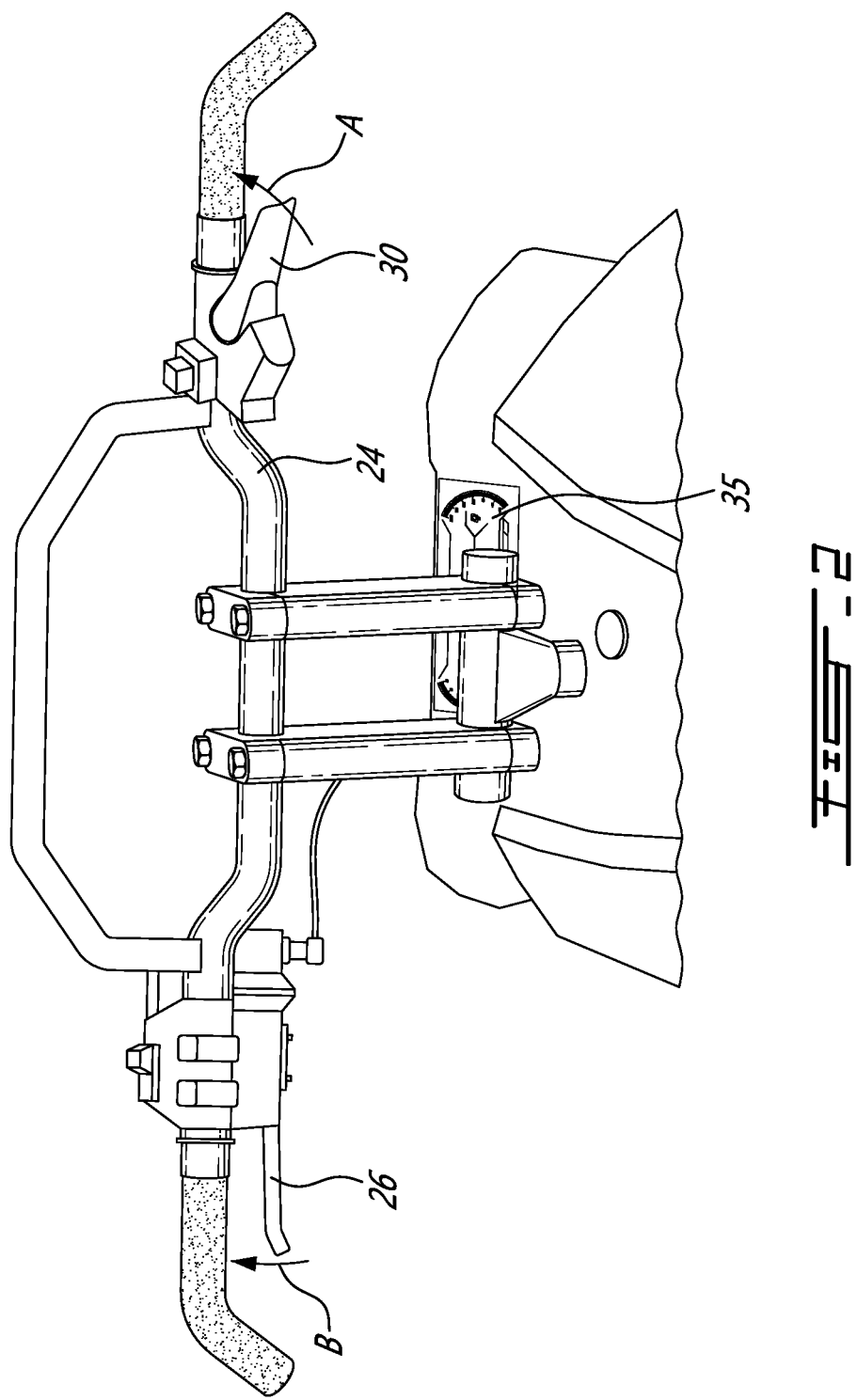

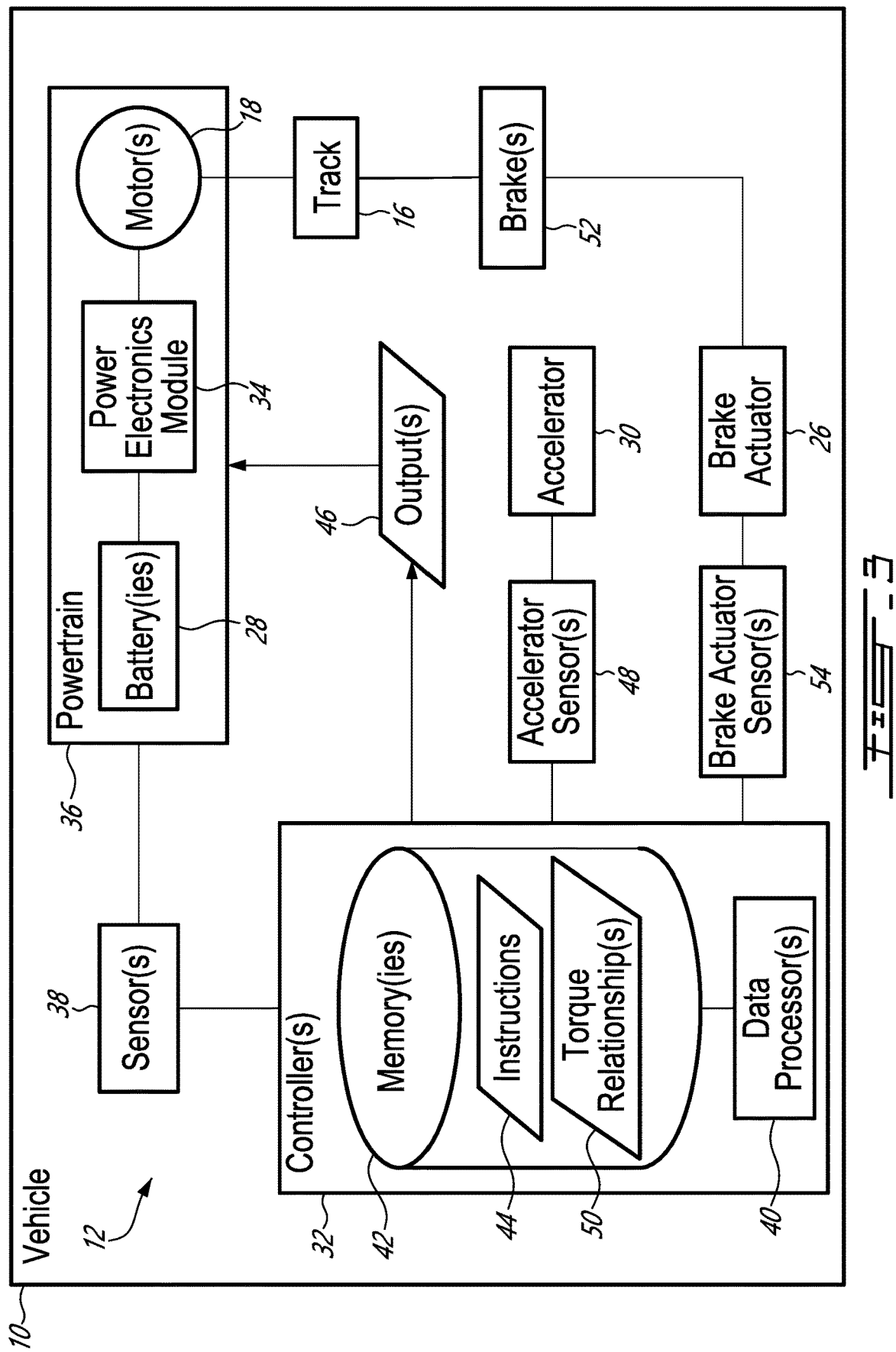

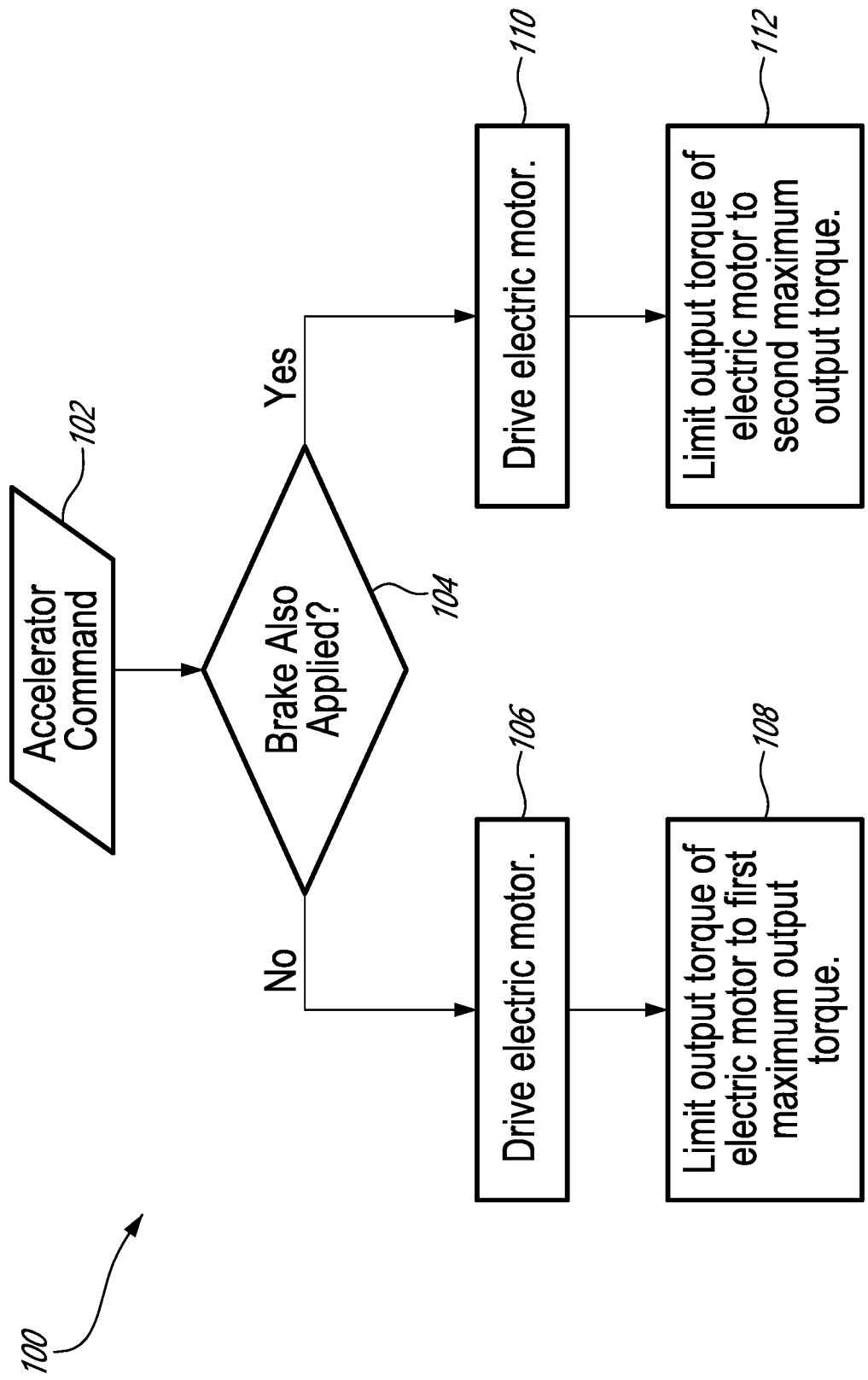

ELECTRIC VEHICLE WITH WEAR MITIGATION

CROSS-REFERENCE TO RELATED APPLICATION(S)

This application claims priority from U.S. Provisional Patent Application No. 63/292,645, filed Dec. 22, 2021, which is incorporated by reference in its entirety herein.

TECHNICAL FIELD

The disclosure relates generally to electric vehicles, and more particularly to mitigating wear of components of electric powersport vehicles.

BACKGROUND

Some vehicles can be operated by actuating an accelerator and a brake at the same time in some situations. This technique can be used to build up torque so that when the brake is released, a higher initial acceleration of the vehicle can be achieved. However, actuating both the accelerator and the brake in this manner can increase wear and tear on the vehicle. Improvement is desirable.

SUMMARY

In one aspect, the disclosure describes an electric snowmobile comprising:
  an electric motor for propelling the electric snowmobile;
  a battery operatively connected to supply electric power to the electric motor when the electric snowmobile is propelled by the electric motor;
  an accelerator actuatable by an operator of the electric snowmobile to cause the motor to propel the snowmobile;
  a brake actuator actuatable by the operator of the electric snowmobile to cause slowing down of the electric snowmobile; and
  a controller operatively connected to the electric motor, the accelerator and the brake actuator, the controller being configured to:
  when the accelerator is actuated and the brake actuator is not actuated, cause the electric motor to be driven according to a first relationship between an actuation of the accelerator and an output torque of the electric motor, the first relationship defining a first maximum output torque for the electric motor; and
  when both the accelerator and the brake actuator are concurrently actuated, cause the electric motor to be driven according to a second relationship between the actuation of the accelerator and the output torque of the electric motor, the second relationship defining a second maximum output torque for the electric motor, the second maximum output torque being lower than the first maximum output torque.

The second maximum output torque may be between 20% and 80% of the first maximum output torque. The second maximum output torque may be between 40% and 60% of the first maximum output torque.

The first relationship and the second relationship may be substantially identical below a value of the second maximum output torque.

The first relationship and the second relationship may have different slopes below a value of the second maximum output torque.

The first relationship and the second relationship may have different slopes over an entire range of actuation of the accelerator.

The second maximum output torque may be lower when an application of the brake actuator corresponds to a first braking intensity than when the application of the brake actuator corresponds to a second braking intensity different from the first braking intensity.

The second maximum output torque may be lower when the electric snowmobile is in a first operating mode than when the electric snowmobile is in a second operating mode.

The first maximum output torque may be lower when the electric snowmobile is in the first operating mode than when the electric snowmobile is in the second operating mode.

When the accelerator is actuated and the brake actuator is not actuated, the electric motor may be drivable to output a first maximum output power. When both the accelerator and the brake actuator are concurrently actuated, the electric motor may be drivable to output a second maximum output power lower than the first maximum output power. The controller may be configured to determine the second maximum output torque based on the second maximum output power and a current rotational speed of the electric motor.

When the accelerator is actuated and the brake actuator is not actuated, the electric motor may be drivable to operate up to a first maximum rotational speed. When both the accelerator and the brake actuator are concurrently actuated, the electric motor may be drivable to operate up to a second maximum rotational speed lower than the first maximum rotational speed.

Embodiments may include combinations of the above features.

In another aspect, the disclosure describes an electric vehicle with wear mitigation. The electric vehicle comprises:
  an electric motor for propelling the electric vehicle;
  a battery operatively connected to supply electric power to the electric motor when the electric vehicle is propelled by the electric motor;
  an accelerator actuatable by an operator of the electric vehicle to cause the electric motor to propel the vehicle;
  a brake actuator actuatable by the operator of the electric vehicle to cause slowing down of the electric vehicle; and
  a controller operatively connected to the electric motor, the accelerator and the brake actuator, the controller being configured to:
  when the accelerator is actuated by a maximum actuation amount and the brake actuator is not actuated, cause the electric motor to be driven to produce a first non-zero output torque equal to a first maximum output torque; and
  when the accelerator is actuated by the maximum actuation amount and the brake actuator is concurrently actuated, cause the electric motor to be driven to produce a second non-zero output torque equal to a second maximum output torque lower than the first maximum output torque.

The accelerator and the brake actuator may be hand-operable.

The second maximum output torque may be between 20% and 80% of the first maximum output torque.

The second maximum output torque may be lower when an application of the brake actuator corresponds to hard braking than when the application of the brake actuator corresponds to soft braking.

The second maximum output torque may be lower when the electric vehicle is in a first operating mode than when the electric vehicle is in a second operating mode.

The controller may be configured to: when the accelerator is actuated by the maximum actuation amount and the brake actuator is not actuated, cause the electric motor to be driven to output a first maximum output power; when the accelerator is actuated by the maximum actuation amount and the brake actuator is concurrently actuated, cause the electric motor to be driven to output a second maximum output power lower than the first maximum output power; and determine the second maximum output torque based on the second maximum output power and a current rotational speed of the electric motor.

The controller may be configured to:
when the accelerator is actuated by a maximum actuation amount and the brake actuator is not actuated, cause the electric motor to be driven to operate up to a first maximum rotational speed; and
when the accelerator is actuated by the maximum actuation amount and the brake actuator is concurrently actuated, cause the electric motor to operate up to a second maximum rotational speed lower than the first maximum rotational speed.

Embodiments may include combinations of the above features.

In a further aspect, the disclosure describes a method of operating an electric powersport vehicle. The method comprises:
receiving an accelerator command via an accelerator actuatable by an operator of the electric powersport vehicle;
when the accelerator command exists at a different time as a braking command received via a brake actuator actuatable by the operator of the electric powersport vehicle:
driving an electric motor configured to propel the electric powersport vehicle to produce a first non-zero output torque based on the accelerator command; and
limiting the first non-zero output torque to a first maximum output torque;
when the accelerator command exists at a same time as the braking command:
driving the electric motor configured to propel the electric powersport vehicle to produce a second non-zero output torque based on the accelerator command; and
limiting the second non-zero output torque to a second maximum output torque lower than the first maximum output torque.

When the accelerator command is indicative of a requested output torque from the electric motor lower than the second maximum output torque, the first non-zero output torque may be substantially equal to the second non-zero output torque. When the accelerator command is indicative of a requested output torque from the electric motor greater than the second maximum output torque, the second non-zero output torque may be lower than the second non-zero output torque.

The second maximum output torque may be between 20% and 80% of the first maximum output torque.

The second maximum output torque may be lower when an application of the brake actuator corresponds to hard braking than when the application of the brake actuator corresponds to soft braking.

The second maximum output torque may be lower when the electric powersport vehicle is in a first operating mode than when the electric powersport vehicle is in a second operating mode.

The accelerator command may be indicative of a maximum actuation amount of the accelerator.

The method may comprise: when the accelerator command exists at the different time as the braking command, limiting the electric motor to a first maximum output power during operation of the electric motor; when the accelerator command exists at the same time as the braking command: limiting the electric motor to a second maximum output power lower than the first maximum output power during operation of the electric motor; and determining the second maximum output torque based on the second maximum output power and a current rotational speed of the electric motor.

The method may comprise: when the accelerator command exists at the different time as the braking command, limiting the electric motor to a first maximum rotational speed during operation of the electric motor; and when the accelerator command exists at the same time as the braking command, limiting the electric motor to a second maximum rotational speed lower than the first maximum rotational speed during operation of the electric motor.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic representation of an exemplary electric vehicle including a propulsion system as described herein;

FIG. 2 is a forward-looking view of part of the electric vehicle of FIG. 1;

FIG. 3 is an exemplary schematic representation of the electric vehicle of FIG. 1;

FIG. 4 is a flow diagram of a method of operating an electric vehicle;

DETAILED DESCRIPTION

Figure 5A:
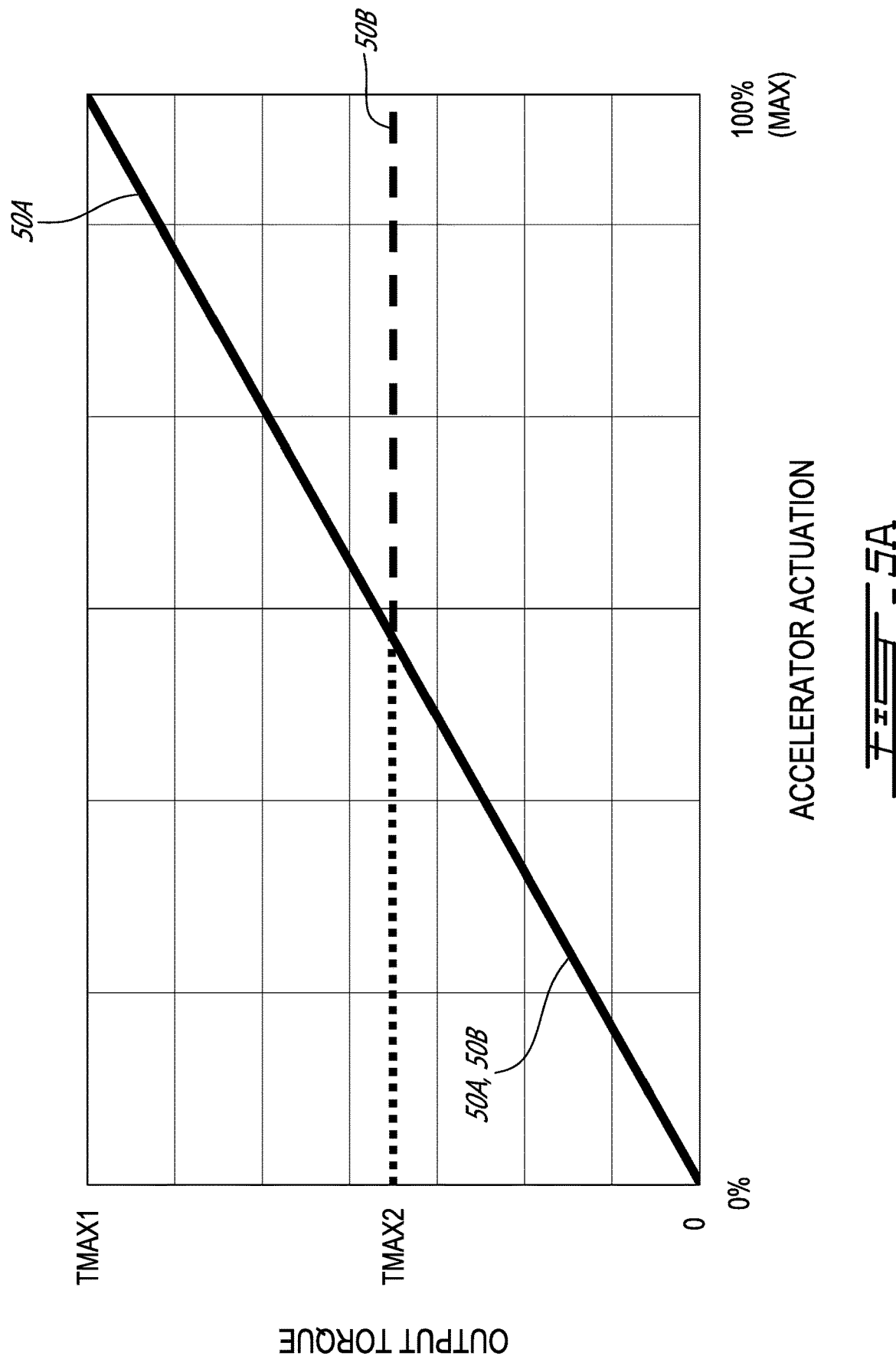
FIGS. 5A and 5B are graphs showing exemplary relationships between an actuation of an accelerator of the electric vehicle of FIG. 1, and an output torque of a motor of the electric vehicle of FIG. 1.

This disclosure describes electric (e.g., powersport) vehicles, associated (e.g., propulsion) systems, and methods for mitigating wear on such vehicles during operation of the vehicles. In some embodiments, the vehicles, systems and methods described herein may allow the actuation of the accelerator and braking at the same time to build up torque so that when the vehicle is stationary and the brake is released, a higher initial acceleration of the vehicle can be achieved. This technique may be desirable by some operators in some situations to provide a sudden (i.e., burst of) acceleration to propel the vehicle forward up a hill or over an obstacle. For example, this technique may be used to launch a snowmobile up or out of a snowbank. During the concurrent application of the accelerator and the brake actuator, the vehicles, systems and methods described herein may mitigate wear and tear on brakes and powertrain components of the vehicles by limiting (i.e., capping) a maximum output torque, power, and/or rotational speed that may be output by electric motors of the vehicles.

In some embodiments, the vehicles, systems and methods described herein may also promote a safe operation of the vehicles. For example, in the event of an inadvertent concurrent actuation of both the accelerator and the brake actuator, limiting the output torque and/or power as described herein may limit a magnitude of an acceleration of the vehicle if/when the brake is released.

The terms "coupled" and "connected" may include both direct coupling and connection (in which two elements contact each other) and indirect coupling and connection (in which at least one additional element is located between the two elements). The term "connected" is also intended to encompass electrical connections.

The term "substantially" as used herein may be applied to modify any quantitative representation which could permissibly vary without resulting in a change in the basic function to which it is related.

Aspects of various embodiments are described through reference to the drawings.

FIG. 1 is a schematic representation of an exemplary electric powersport vehicle 10 (referred hereinafter as "vehicle 10") including propulsion system 12 as described herein. As illustrated in FIG. 1, vehicle 10 may be a snowmobile but aspects of the present disclosure may also be implemented on other types of electric vehicles such as electric (e.g., side-by-side) utility task vehicles (UTVs), electric all-terrain vehicles (ATVs), electric motorcycles, and other electric off-road or powersport vehicles. In some embodiments, vehicle 10 may be an electric snowmobile including elements of the snow vehicle described in International Patent Publication No. WO 2019/049109 A1 (Title: BATTERY ARRANGEMENT FOR ELECTRIC SNOW VEHICLES), and U.S. Patent Application No. 63/135,497 (Title: ELECTRIC VEHICLE WITH BATTERY PACK AS STRUCTURAL ELEMENT), which are incorporated herein by reference.

Vehicle 10 may include: a frame (also known as a chassis) which may include tunnel 14; track 16 having the form of an endless belt for engaging the ground and located under tunnel 14; one or more electric motors 18 (referred hereinafter in the singular as "motor 18") mounted to the frame and configured to drive track 16; left and right skis 20 disposed in a front portion of vehicle 10; straddle seat 22 disposed above tunnel 14 for accommodating an operator of vehicle 10 and optionally one or more passengers. Skis 20 may be movably attached to the frame to permit steering of vehicle 10 via a steering assembly including a steering column interconnecting handlebar 24 with skis 20.

Motor 18 may be drivingly coupled to track 16 via a drive shaft. Electric motor 18 may be in torque-transmitting engagement with the drive shaft via a belt/pulley drive. However, motor 18 may be in torque-transmitting engagement with the drive shaft via other arrangements such as a chain/sprocket drive, or shaft/gear drive for example. The drive shaft may be drivingly coupled to track 16 via one or more toothed wheels or other means so as to transfer motive power from motor 18 to track 16. In various embodiments, motor 18 may be a permanent magnet synchronous motor or a brushless direct current motor for example. In some embodiments, motor 18 may have a power output rating of between 90 and 180 horsepower, or motor 18 may have a maximum output power rating of greater than 180 horsepower, for example. Motor 18 may be of a same type as, or may include elements of, the motors described in U.S. Provisional Patent Application No. U.S. 63/135,466 (Title: DRIVE UNIT FOR ELECTRIC VEHICLE) and U.S. Provisional Patent Application No. U.S. 63/135,474 (Title: DRIVE UNIT WITH FLUID PATHWAYS FOR ELECTRIC VEHICLE), which are both incorporated herein by reference. In some embodiments, multiple motors may be implemented to drive vehicle 10.

Vehicle 10 may also include one or more brakes that may be applied or released by an actuation of a suitable brake actuator 26 (also shown in FIGS. 2 and 3), which may be a hand-operable lever, actuatable by the operator for example. In various embodiments, the brake(s) may include a friction-type brake including a master cylinder hydraulically connected to a brake caliper that forces brake pads against a brake rotor or disk that is coupled to a powertrain of vehicle 10. In some embodiments, vehicle 10 may include a braking system as described in U.S. Patent Publication No. 2021/0129680 A1 (Title: BRAKING SYSTEM FOR AN OFF-ROAD VEHICLE), which is incorporated herein by reference.

In some embodiments, actuation of brake actuator 26 may cause a combination of friction braking and regenerative braking. Regenerative braking may also be applied in isolation, i.e., without friction braking. In some embodiments, regenerative braking may be used such that battery(ies) 28 (referred hereinafter in the singular) of vehicle 10 is/are supplied with electric energy generated by motor 18 operating as a generator when brake actuator 26 is applied, and/or when the operator releases accelerator 30 and vehicle 10 is in motion.

Battery 28 may provide electric power to motor 18 for driving motor 18 when vehicle 10 is being propelled by motor 18. Battery 28 may be a main battery pack used for propelling vehicle 10. In other words, battery 28 may also be referred to as a "motoring" or "traction" battery pack. Battery 28 may be located under seat 22. In some embodiments, battery 28 may be a rechargeable multi-module, multi-cell lithium ion or other type of battery pack. In some embodiments, battery 28 may be configured to output electric power at a voltage of between 300-400 volts, or up to 800 volts, for example.

The operation of motor 18 and the delivery of electric power to motor 18 from battery 28 may be controlled by one or more vehicle controllers 32 (referred hereinafter in the singular as "controller 32") based on an actuation of accelerator 30, also referred to as "throttle", by the operator. Accelerator 30 (also shown in FIGS. 2 and 3) may be a hand-operable lever actuatable by the operator for example. The delivery of electric power to motor 18 may be controlled via a suitable power electronics module 34 (shown in FIG. 3), such as a power inverter, including electronic switches (e.g., insulated gate bipolar transistor(s)) to provide motor 18 with electric power having the desired voltage, current, waveform, etc. to implement the desired performance of vehicle 10. Controller 32 may include one or more electronic control units (ECUs), or one or more electronic control modules (ECMs) in some embodiments. An example of an ECU or ECM is a motor controller, which may be or include the power inverter.

FIG. 2 is a forward-looking view of part of vehicle 10 including handlebar 24 from the operator's vantage point. Brake actuator 26 may be mounted to a left portion of handlebar 24, and may be a lever operable by a left hand of the operator by pulling the level along the direction indicated by arrow B. Accelerator 30 may be mounted to a right portion of handlebar 24, and may be a lever operable by a right hand of the operator by pushing the level along the direction indicated by arrow A. Vehicle 10 may include instrument panel 35. Instrument panel 35 may be provided on a display screen disposed forwardly of handlebar 24. Instrument panel 35 may provide the operator with information such as vehicle speed, remaining battery charge, other operating parameters and/or pertinent information.

FIG. 3 is another exemplary schematic representation of vehicle 10. Vehicle 10 may include powertrain 36, which may include battery 28, power electronics module 34 and motor 18 for providing propulsive power to vehicle 10. Motor 18 may be drivingly coupled to track 16. For UTVs, motorcycles and ATVs for example, motor 18 may be drivingly coupled to wheels and tires as ground-engaging members.

Vehicle 10 may include one or more sensors 38 operatively connected to component(s) of powertrain 36. Sensor(s) 38 may be configured to sense one or more parameters of powertrain 36. Sensor(s) 38 may include one or more current sensors and/or one or more voltage sensors operatively connected to battery 28 and/or connected to power electronics module 34. Sensor(s) 58 may include one or more position sensors (e.g., rotary encoder) and/or speed sensors (e.g., tachometer) suitable for measuring the angular position and/or angular speed of a rotor of motor 18 and/or of another rotating component of powertrain 36. Sensor(s) 38 may include one or more torque sensors (e.g., a rotary torque transducer) for measuring an output torque of motor 18. Alternatively, the output torque of motor 18 may be inferred based on the amount of electric power (e.g., current) being supplied to motor 18 for example.

Depending on the type of vehicle 10, the speed of vehicle 10 may be derived from an operating speed of motor 18 or other component of propulsion system 12, obtained via any suitable sensor(s). Alternatively or in addition, the speed of vehicle 10 may be determined using a satellite navigation device such as a global positioning system (GPS) receiver operatively connected to controller 32.

Controller 32 may be configured to control motor 18 based on feedback received via sensor(s) 38. Controller 32 may include one or more data processors 40 (referred hereinafter as "processor 40") and non-transitory machine-readable memory 42. Controller 32 may be operatively connected to sensor(s) 38 via wired or wireless connections for example so that one or more parameters acquired via sensor(s) 38 may be received at controller 32 and used by processor 40 in one or more procedures or steps defined by instructions 44 stored in memory 42 and executable by processor 40.

Controller 32 may carry out additional functions than those described herein. For example, controller 32 may be in communication with and optionally perform control functions associated with a steering system, power management, and thermal management of vehicle 10 for example. Processor 40 may include any suitable device(s) configured to cause a series of steps to be performed by controller 32 so as to implement a computer-implemented process such that instructions 44, when executed by controller 32 or other programmable apparatus, may cause the functions/acts specified in the methods described herein to be executed.

Processor 40 may include, for example, any type of general-purpose microprocessor or microcontroller, a digital signal processing (DSP) processor, an integrated circuit, an application specific integrated circuit (ASIC), a field programmable gate array (FPGA), a reconfigurable processor, other suitably programmed or programmable logic circuits, or any combination thereof.

Memory 42 may include any suitable machine-readable storage medium. Memory 42 may include non-transitory computer readable storage medium such as, for example, but not limited to, an electronic, magnetic, optical, electromagnetic, infrared, or semiconductor system, apparatus, or device, or any suitable combination of the foregoing. Memory 42 may include a suitable combination of any type of machine-readable memory that is located either internally or externally of controller 32. Memory 42 may include any storage means (e.g., devices) suitable for retrievably storing machine-readable instructions 44 executable by processor 40.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 42) having computer readable program code (e.g., instructions 44) embodied thereon. Computer program code for carrying out operations for aspects of the present disclosure in accordance with instructions 44 may be written in any combination of one or more programming languages. Such program code may be executed entirely or in part by controller 32 or other data processing device(s). It is understood that, based on the present disclosure, one skilled in the relevant arts could write computer program code for implementing the methods described and illustrated herein.

Controller 32 may generate output(s) 46 for controlling the operation of powertrain 36 and/or other function(s) of vehicle 10. For example, based on a sensed actuation position of accelerator 30, controller 32 may generate output(s) 46 for controlling the delivery of electric power from battery 28 to motor 18 according to instructions 44. The actuation position of accelerator 30 may be sensed via accelerator sensor 48, which may be configured to detect the actuation of accelerator 30, and communicate with controller 32. Based on the actuation position of accelerator 30, controller 32 may cause motor 18 to be driven to generate a corresponding output torque. The control of motor 18 may be based on one or more motor output (e.g., torque) relationships 50, power relationship(s) and/or motor speed relationship(s) stored in memory 42. Relationship(s) 50 may define output torque values of motor 18 associated with different actuation positions of accelerator 30. For example, a small displacement of accelerator 30 may correspond to a small output torque of motor 18 and a large displacement of accelerator 30 may correspond to a large output torque of motor 18. Accelerator sensor 48 may, for example, include a rotary variable differential transformer (RVDT) for measuring an angular displacement of accelerator 30, a linear variable differential transformer LVDT for measuring a linear displacement of accelerator 30, a force transducer for measuring an actuation force applied onto accelerator 30, or another suitable sensor.

Brake actuator 26 may be operatively connected to cause brake(s) 52 to apply a suitable frictional braking force on one or more components of powertrain 36 to cause slowing down of vehicle 10 or to prevent movement of vehicle 10 by hindering or preventing the movement of track 16 for example. The actuation of brake actuator 26 may also cause regenerative braking when vehicle 10 is in motion as explained above. A displacement amount of brake actuator 26 and/or the force applied onto brake actuator 26 may be indicative of a desired braking intensity. For example, a larger displacement of brake actuator 26 may be indicative of a desired hard (i.e., strong) braking, and a smaller displacement of brake actuator 26 may be indicative of a desired soft (i.e., weak) braking.

In some embodiments, brake actuator sensor 54 may include a switch providing a binary (e.g., ON/OFF) indication to controller 32 of whether or not brake actuator 26 is being actuated. In some embodiments, brake actuator sensor 54 may provide an indication of a commanded braking intensity based on the displacement and/or force applied onto brake actuator 26 by the operator. Brake actuator sensor 54 may, for example, include a RVDT for measuring an angular displacement of brake actuator 26, a LVDT for measuring a linear displacement of brake actuator 26, a force transducer for measuring an actuation force applied onto brake actuator 26, a pressure transducer for measuring a pressure of brake fluid used in a hydraulic braking system of vehicle 10, or another suitable sensor.

Signals received by controller 32 from acceleration sensor 48 and brake actuator sensor 54 may be used by controller 32 to determine whether an accelerator command coexists with a braking command, or whether the accelerator command exists at a different time as the braking command. Depending on whether or not the accelerator command and the braking command coexist, controller 32 may implement different propulsive behaviours of vehicle 10 as explained below.

FIG. 4 is a flow diagram of method 100 of operating vehicle 10. Method 100 may be performed using propulsion system 12 or another propulsion system. In some embodiments, method 100 is executed by controller 32. Aspects of method 100 may be combined with other actions described herein. Aspects of propulsion system 12 and of vehicle 10 may be incorporated into method 100. In various embodiments, method 100 may include:
- receiving an accelerator command via accelerator 30 actuatable by an operator of vehicle 10 (block 102);
- at block 104, it is determined whether the accelerator command coexists with a braking command;
- when the accelerator command exists at a different time as a braking command received via a brake actuator actuatable by the operator of vehicle 10 (i.e., "No" at block 104):
- driving motor 18 configured to propel vehicle 10 to produce a first non-zero output torque based on the accelerator command (block 106); and
- limiting the first non-zero output torque to a first maximum output torque TMAX1 (block 108, FIGS. 5A and 5B);
- when the accelerator command exists at a same time as the braking command (i.e., "Yes" at block 104):
- driving motor 18 configured to propel vehicle 10 to produce a second non-zero output torque based on the accelerator command (block 110); and
- limiting the second non-zero output torque to a second maximum output torque TMAX2 lower than first maximum output torque TMAX1 (block 112, FIGS. 5A and 5B).

When the accelerator command is received when braking is also taking place, motor 18 may still be driven to output some (non-zero) torque but the maximum output torque available from motor 18 may be intentionally reduced (i.e., capped) by controller 32 using relationship(s) 50. This way, the operator may still be permitted to build-up some torque for the purpose of obtaining a higher initial acceleration of vehicle 10, but the reduced maximum output torque may limit wear on brake 52 and/or on other (e.g., powertrain) components of vehicle 10. Method 100 may be performed when vehicle 10 is stationary and when vehicle 10 is in motion.

Aspects of method 100 are explained below in relation to FIGS. 5A, 5B and 6.

FIG. 5A shows a graph with two exemplary relationships 50A, 50B (e.g., torque curves) between the actuation of accelerator 30 of vehicle 10, and an output torque of motor 18 of vehicle 10. The output torque of motor 18 may be measured directly, or relationships 50A, 50B may be based on values of electric current being delivered to motor 18 as indicative of the output torque of motor 18 for example. Relationships 50A, 50B may be stored in memory 42 or be otherwise available to controller 32 to enable controller 32 to implement method 100. Relationships 50A, 50B may be stored in memory 42 in the form of one or more look-up tables for example. Relationships 50A, 50B are illustrated as being linear as an example but may be non-linear. In various embodiments of vehicle 10, relationships 50A, 50B may be fixed (e.g., factory-defined), or may be operator-customizable via a suitable operator interface based on an operator's preferred performance behaviour of vehicle 10.

Wear mitigation for vehicle 10 may be implemented by controller 32 using relationships 50A, 50B. For example, when accelerator 30 is actuated by an amount greater than 0% actuation and up to a maximum actuation of 100%, and brake actuator 26 is not actuated, controller 32 may cause motor 18 to be driven according to first relationship 50A. First relationship 50A may define first maximum output torque TMAX1 that may be output by motor 18. On the other hand, when accelerator 30 is actuated by an amount greater than 0% actuation and up to a maximum actuation of 100%, and brake actuator 26 is concurrently actuated, the accelerator command and the braking command may be considered to coexist, and controller 32 may cause motor 18 to be driven according to second relationship 50B. Second relationship 50B may define second maximum output torque TMAX2 that may be output by motor 18. As shown in FIG. 5A, second maximum output torque TMAX2 may be lower than first maximum output torque TMAX1 so that TMAX2<TMAX1.

In various embodiments, second maximum output torque TMAX2 may be selected to be between 20% and 80% of first maximum output torque TMAX1. In some embodiments, second maximum output torque TMAX2 may be selected to be between 40% and 60% of first maximum output torque TMAX1. In some embodiments, second maximum output torque TMAX2 may be selected to be less than 60% of first maximum output torque TMAX1. In some embodiments, second maximum output torque TMAX2 may be selected to be higher than 20% of first maximum output torque TMAX1. In some embodiments, second maximum output torque TMAX2 may be selected to be about 50% of first maximum output torque TMAX1. In some embodiments, second maximum output torque TMAX2 may be selected to be about 60% of first maximum output torque TMAX1. In some embodiments, second maximum output torque TMAX2 may be an operator-variable operating parameter that the operator may select or tune to tailor performance characteristics of vehicle 10 based on operator preferences, operator experience levels, and/or on the conditions in which vehicle 10 is operated for example.

In some embodiments, one or more portions of first relationship 50A and of second relationship 50B may be substantially identical. As shown in FIG. 5A for example, first relationship 50A and second relationship 50B may be substantially identical below a value of second maximum output torque TMAX2 (e.g., at about 50% actuation of accelerator 30). In reference to FIG. 5A for example, when the accelerator command is indicative of a requested output torque from motor 18 lower than second maximum output torque TMAX2, the torque output from motor 18 would be the same whether or not the accelerator command and the braking command coexist. On the other hand, when the accelerator command is indicative of a requested output torque from motor 18 higher than second maximum output torque TMAX2, the torque output from motor 18 would be limited to second maximum output torque TMAX2 if the accelerator command and the braking command coexist. In this scenario, the torque output from motor 18 would be lower when the accelerator command and the braking command coexist than when the accelerator command does not coexist with the braking command.

In another scenario where the accelerator command is indicative of a maximum actuation amount (e.g., 100%) of accelerator 30 and brake actuator 26 is not actuated, controller 32 may cause motor 18 to be driven to produce a non-zero output torque equal to first maximum output torque TMAX1. However, when the accelerator command is indicative of the maximum actuation amount (e.g., 100%) of accelerator 30 and brake actuator 26 is concurrently actuated, controller 32 may cause motor 18 to be driven to produce a non-zero output torque equal to second maximum output torque TMAX2 that is lower than first maximum output torque TMAX1.

Figure 5B:
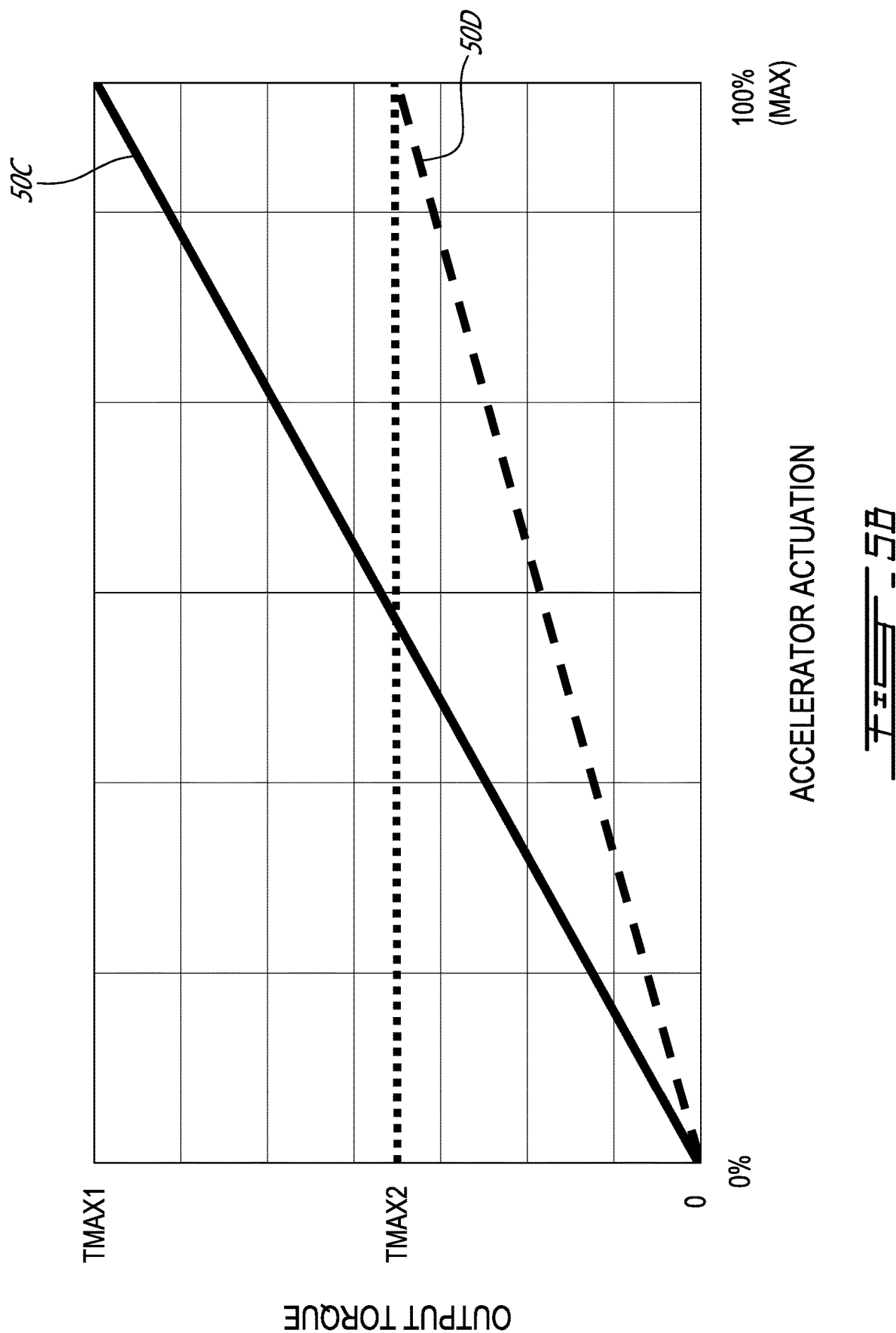

FIG. 5B is a graph showing other exemplary relationships 50C, 50D between the actuation of accelerator 30 of vehicle 10, and an output torque of motor 18 of vehicle 10. As explained above in reference to FIG. 5A, relationships 50C, 50D of FIG. 5B may similarly be used by controller 32 to implement wear mitigation for vehicle 10. For example, when accelerator 30 is actuated by an amount greater than 0% actuation and up to a maximum actuation of 100%, and brake actuator 26 is not actuated, controller 32 may cause motor 18 to be driven according to third relationship 50C. Third relationship 50C may define first maximum output torque TMAX1 that may be output by motor 18. On the other hand, when accelerator 30 is actuated by an amount greater than 0% actuation and up to a maximum actuation of 100%, and brake actuator 26 is concurrently actuated, the accelerator command and the braking command may be considered to coexist, and controller 32 may cause motor 18 to be driven according to fourth relationship 50D. Fourth relationship 50D may define second maximum output torque TMAX2 that may be output by motor 18. Second maximum output torque TMAX2 may be lower than first maximum output torque TMAX1 so that TMAX2<TMAX1.

In contrast with first relationship 50A and second relationship 50B, third relationship 50C and fourth relationship 50D may be substantially different. In other words, other than having a common start point at no (i.e., 0%) actuation amount of accelerator 30, third relationship 50C and fourth relationship 50D may be substantially entirely non-coincident. In some embodiments, third relationship 50C and fourth relationship 50D may be divergent. For example, third relationship 50C and fourth relationship 50D may have different slopes below a value of second maximum output torque TMAX2. For example, third relationship 50C and fourth relationship 50D may have different slopes over an entire range of actuation of accelerator 30.

Some of relationships 50A-50D shown in FIGS. 5A and 5B or elements thereof may be associated with different operating modes of vehicle 10 so that the values of first maximum output torque TMAX1 and/or of second maximum output torque TMAX2 may also differ based on the active operating mode of vehicle 10. In some embodiments, vehicle 10 may be equipped with factory-defined operating modes such as economy, normal and sport modes, which may define different performance characteristics of vehicle 10. For example, such operating modes may correspond to performance and/or operator skill levels such as novice, intermediate and expert respectively, and may come with factory-defined sets of operating parameters for vehicle 10. For example, an "eco" or economy operating mode may be intended to assist the operator in driving in a way that promotes an extended battery range. A sport operating mode may be intended to provide increased acceleration responsiveness. A normal mode may facilitate a vehicle performance between the economy and sport modes.

In some embodiments, vehicle 10 may enable the use of specific operator-variable operating parameters to facilitate expanded customization capabilities and a wider range of operator experiences available with vehicle 10. Such operator-variable operating parameters may be used to define operator-defined operating modes for vehicle 10. The use of operator-variable operating parameters may provide more freedom in tailoring the performance characteristics of vehicle 10 based on operator preferences, operator experience levels, and/or on the conditions in which vehicle 10 is operated for example. The operator-variable operating parameters may correspond to operator-defined variables within the control software executed by controller 32.

In some embodiments, different operating modes of vehicle 10 may make use of different or modified relationships 50A-50D and may therefore make use of different values of first maximum output torque TMAX1 and second maximum output torque TMAX2. For example, some characteristics of first relationship 50A and of third relationship 50C may differ for different operating modes of vehicle 10. For example, first maximum output torque TMAX1 may be lower when vehicle 10 is in an economy operating mode than when vehicle 10 is in a sport operating mode. For example, the value of TMAX1 may be lower in an "eco" mode than in a "normal" mode, and the value of TMAX1 may be lower in a "normal" mode than in a "sport" mode, so that $TMAX1_{eco} < TMAX1_{normal} < TMAX1_{sport}$. Similarly, some characteristics of second relationship 50B and of fourth relationship 50D may differ for different operating modes of vehicle 10. For example, second maximum output torque TMAX2 may be lower when vehicle 10 is in an economy operating mode than when vehicle 10 is in a sport operating mode. For example, the value of TMAX2 may be lower in an "eco" mode than in a "normal" mode, and the value of TMAX2 may be lower in a "normal" mode than in a "sport" mode, so that $TMAX2_{eco} < TMAX2_{normal} < TMAX2_{sport}$.

Figure 6:
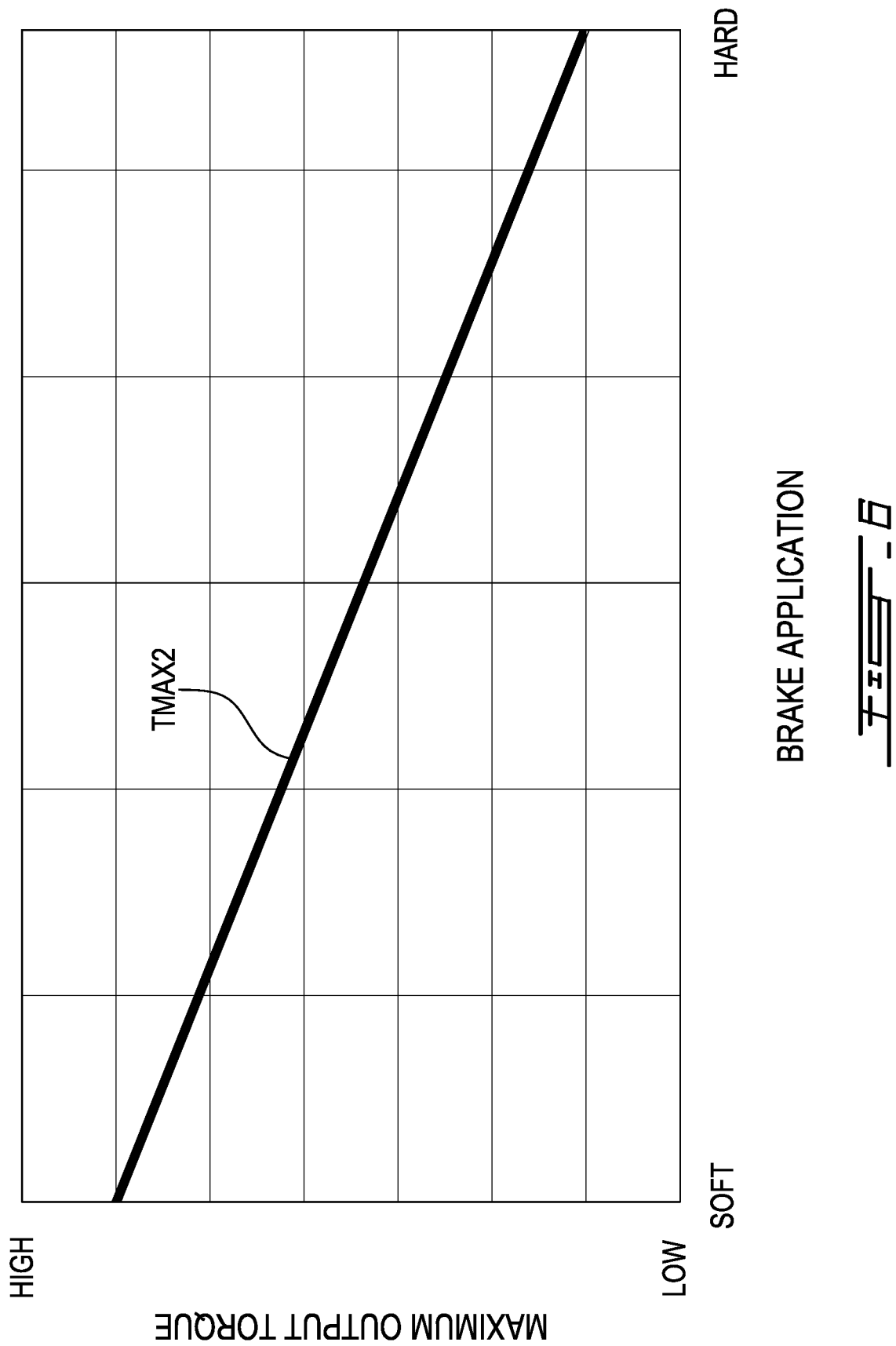
FIG. 6 is a graph showing an exemplary relationship between a brake application and a maximum output torque of the motor of the electric vehicle of FIG. 1.

FIG. 6 is a graph showing an exemplary relationship between brake application and second maximum output torque TMAX2 that may be used when both accelerator 30 and brake actuator 26 are concurrently actuated. In some embodiments, the value of second maximum output torque TMAX2 may be constant irrespective of braking intensity.

However, in other embodiments, the value of second maximum output torque TMAX2 may vary based on braking intensity. For example, second maximum output torque TMAX2 may be lower or higher when an application of brake actuator 26 corresponds to a first braking intensity than when the application of the brake actuator corresponds to a second braking intensity different from the first braking intensity. For example, second maximum output torque TMAX2 may be lower when the application of brake actuator 26 corresponds to hard braking than when the application of brake actuator 26 corresponds to soft braking.

The relationship between the brake application and second maximum output torque TMAX2 may be linear or non-linear. In some embodiments, the value of second maximum output torque TMAX2 may be proportional to the intensity of the brake application, which may be sensed and represented as a percentage between 0% and 100% for example. In some embodiments, the use of a variable value of second maximum output torque TMAX2 may, for example, mitigate wear on vehicle 10 by limiting the stress applied to components of vehicle 10 in view of the operator's intention associated with the braking intensity. In the example shown in FIG. 6 for example, hard braking may indicate an operator's intention to promptly slow or stop vehicle 10, or to keep vehicle 10 stationary. Accordingly, using a lower value of second maximum output torque TMAX2 output by motor 18 during hard braking may reduce stresses applied to components of powertrain 36 of vehicle 10. Using a lower value of second maximum output torque TMAX2 output by motor 18 during hard braking may also promote a safe operation of vehicle 10 by limiting the output torque output by motor 18, and that could potentially be contrary to the operator's intention.

Figure 7:
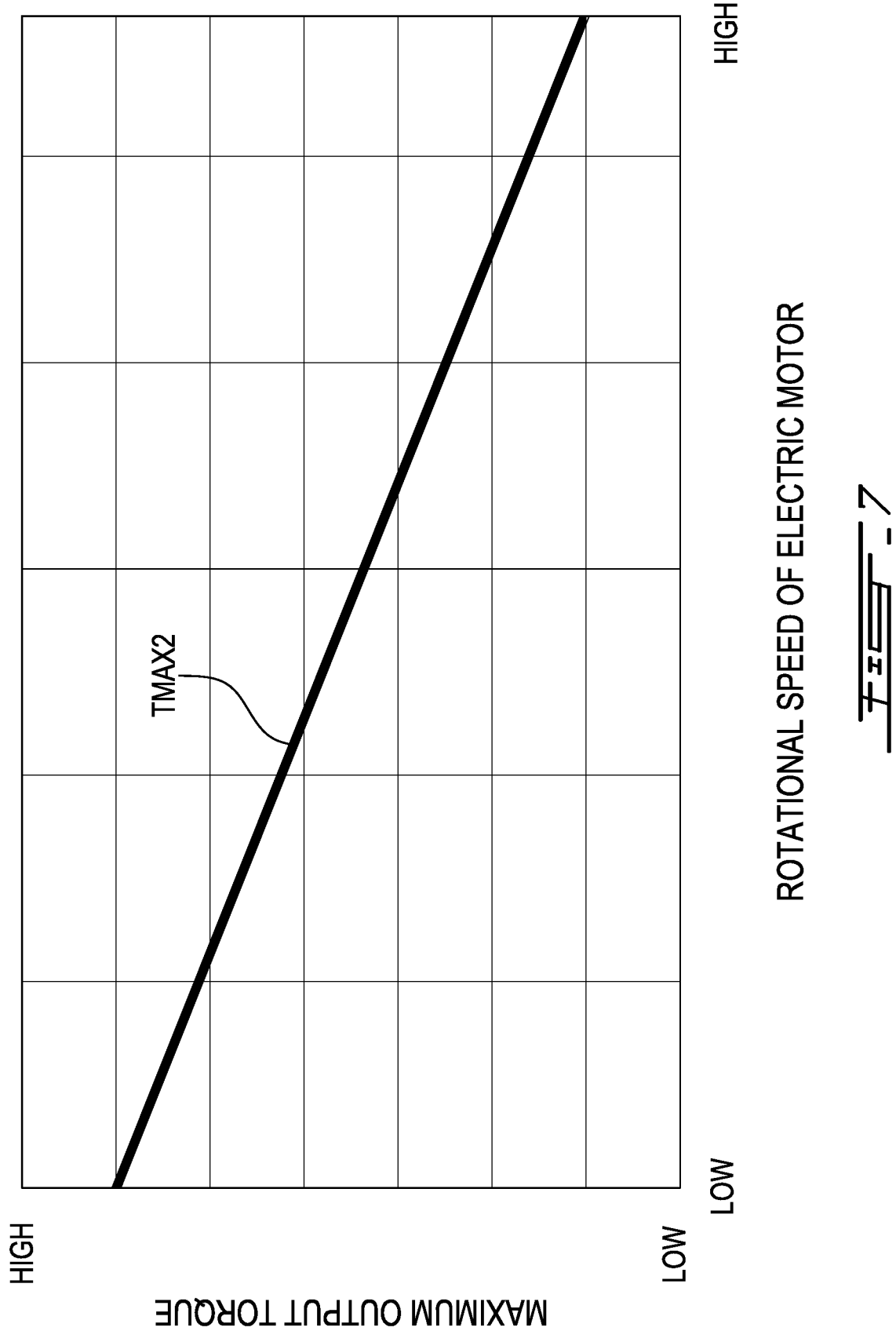
FIG. 7 is a graph showing an exemplary relationship between a rotational speed of the motor of the electric vehicle of FIG. 1, and a maximum output torque of the motor.

FIG. 7 is a graph showing an exemplary relationship between a rotational speed of motor 18 and second maximum output torque TMAX2 that may be used when both accelerator 30 and brake actuator 26 are concurrently actuated. Instead or in addition to limiting only the output torque of motor 18 for wear mitigation as explained above, method 100 may include limiting output power of motor 18 and/or limiting a rotational speed of motor 18 to mitigate wear when both accelerator 30 and brake actuator 26 are concurrently actuated.

For example, when accelerator 30 is actuated and brake actuator 26 is not actuated, motor 18 may be drivable to output a first maximum output power when accelerator 30 is actuated by the maximum actuation amount. However, when both accelerator 30 and brake actuator 26 are concurrently actuated, motor 18 may be drivable to output a second maximum output power lower than the first maximum output power when accelerator 30 is actuated by the maximum actuation amount. Accordingly, when wear mitigation is based on limiting the output power of motor 18, the rotational speed of motor 18 may be taken into account in determining second maximum output torque TMAX2 to be output based on the relationship: second maximum output power=second maximum output torque TMAX2*rotational speed of motor 18. The rotational speed of motor 18 may be indicative of a travel speed of vehicle 10. As shown in FIG. 7, in situations where wear mitigation of method is based on limiting output power of motor 18, second maximum output torque TMAX2 may be determined to be lower at higher current rotational speeds of motor 18. In some situations where the rotational speed of motor 18 may be changing while both accelerator 30 and brake actuator 26 are concurrently actuated, second maximum output torque TMAX2 may be dynamically adjusted based on the current rotational speed of motor 18, and used by controller 32 accordingly.

In other words, when the accelerator command exists at a different time as the braking command, the operation of motor 18 may be limited to the first maximum output power. However, when the accelerator command exists at the same time as the braking command, the operation of motor 18 may be limited to the second maximum output power lower than the first maximum output power. In reference to FIG. 7, second maximum output torque TMAX2 may be determined based on the second maximum output power and a current rotational speed of motor 18.

In some embodiments, method 100 may instead or in addition limit the rotational speed (e.g., revolutions per minute) of motor 18 to promote wear mitigation. For example, when accelerator 30 is actuated and brake actuator 26 is not actuated, motor 18 may be drivable to operate up to a first maximum rotational speed when accelerator 30 is actuated by the maximum actuation amount. In other words, when the accelerator command exists at a different time as the braking command, the operation of motor 18 may be limited to the first maximum rotational speed. However, when both accelerator 30 and brake actuator 26 are concurrently actuated, motor 18 may be drivable to operate up to a second maximum rotational speed lower than the first maximum rotational speed when accelerator 30 is actuated by the maximum actuation amount. In other words, when the accelerator command exists at the same time as the braking command, the operation of motor 18 may be limited to a second maximum rotational speed lower than the first maximum rotational speed.

In various embodiments described herein, the second maximum output torque TMAX2 may be determined based on an operating rotational speed of motor 18, on an operating mode of vehicle 10, and/or on a maximum output power limit.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. An electric snowmobile comprising:
   an electric motor for propelling the electric snowmobile;
   a battery operatively connected to supply electric power to the electric motor when the electric snowmobile is propelled by the electric motor;
   an accelerator actuatable by an operator of the electric snowmobile to cause the electric motor to propel the electric snowmobile;
   a brake actuator actuatable by the operator of the electric snowmobile to cause slowing down of the electric snowmobile; and
   a controller operatively connected to the electric motor, the accelerator and the brake actuator, the controller being configured to:
      when the accelerator is actuated and the brake actuator is not actuated, cause the electric motor to be driven according to a first relationship between an actuation of the accelerator and an output torque of the electric motor, the first relationship defining a first maximum output torque for the electric motor; and when both the accelerator and the brake actuator are concurrently actuated, cause the electric motor to be driven according to a second relationship between the actuation of the accelerator and the output torque of the electric motor, the second relationship defining a second maximum output torque for the electric motor, the second maximum output torque being lower than the first maximum output torque.

2. The electric snowmobile as defined in claim 1, wherein the second maximum output torque is between 20% and 80% of the first maximum output torque.

3. The electric snowmobile as defined in claim 1, wherein the second maximum output torque is between 40% and 60% of the first maximum output torque.

4. The electric snowmobile as defined in claim 1, wherein the first relationship and the second relationship are substantially identical below a value of the second maximum output torque.

5. The electric snowmobile as defined in claim 1, wherein the first relationship and the second relationship have different slopes below a value of the second maximum output torque.

6. The electric snowmobile as defined in claim 1, wherein the first relationship and the second relationship have different slopes over an entire range of actuation of the accelerator.

7. The electric snowmobile as defined in claim 1, wherein the second maximum output torque is lower when an application of the brake actuator corresponds to a first braking intensity than when the application of the brake actuator corresponds to a second braking intensity different from the first braking intensity.

8. The electric snowmobile as defined in claim 1, wherein the second maximum output torque is lower when the electric snowmobile is in a first operating mode than when the electric snowmobile is in a second operating mode.

9. The electric snowmobile as defined in claim 8, wherein the first maximum output torque is lower when the electric snowmobile is in the first operating mode than when the electric snowmobile is in the second operating mode.

10. The electric snowmobile as defined in claim 1, wherein
when the accelerator is actuated and the brake actuator is not actuated, the electric motor is drivable to output a first maximum output power;
when both the accelerator and the brake actuator are concurrently actuated, the electric motor is drivable to output a second maximum output power lower than the first maximum output power; and
the controller is configured to determine the second maximum output torque based on the second maximum output power and a current rotational speed of the electric motor.

11. The electric snowmobile as defined in claim 1, wherein
when the accelerator is actuated and the brake actuator is not actuated, the electric motor is drivable to operate up to a first maximum rotational speed; and
when both the accelerator and the brake actuator are concurrently actuated, the electric motor is drivable to operate up to a second maximum rotational speed lower than the first maximum rotational speed.

12. An electric vehicle with wear mitigation, the electric vehicle comprising:
an electric motor for propelling the electric vehicle;
a battery operatively connected to supply electric power to the electric motor when the electric vehicle is propelled by the electric motor;
an accelerator actuatable by an operator of the electric vehicle to cause the electric motor to propel the electric vehicle;
a brake actuator actuatable by the operator of the electric vehicle to cause slowing down of the electric vehicle; and
a controller operatively connected to the electric motor, the accelerator and the brake actuator, the controller being configured to:
when the accelerator is actuated by a maximum actuation amount and the brake actuator is not actuated, cause the electric motor to be driven to produce a first non-zero output torque equal to a first maximum output torque; and
when the accelerator is actuated by the maximum actuation amount and the brake actuator is concurrently actuated, cause the electric motor to be driven to produce a second non-zero output torque equal to a second maximum output torque lower than the first maximum output torque.

13. The electric vehicle as defined in claim 12, wherein the accelerator and the brake actuator are hand-operable.

14. The electric vehicle as defined in claim 12, wherein the second maximum output torque is between 20% and 80% of the first maximum output torque.

15. The electric vehicle as defined in claim 12, wherein the second maximum output torque is lower when an application of the brake actuator corresponds to hard braking than when the application of the brake actuator corresponds to soft braking.

16. The electric vehicle as defined in claim 12, wherein the second maximum output torque is lower when the electric vehicle is in a first operating mode than when the electric vehicle is in a second operating mode.

17. The electric vehicle as defined in claim 12, wherein, the controller is configured to:
when the accelerator is actuated by the maximum actuation amount and the brake actuator is not actuated, cause the electric motor to be driven to output a first maximum output power;
when the accelerator is actuated by the maximum actuation amount and the brake actuator is concurrently actuated, cause the electric motor to be driven to output a second maximum output power lower than the first maximum output power; and
determine the second maximum output torque based on the second maximum output power and a current rotational speed of the electric motor.

18. The electric vehicle as defined in claim 12, wherein, the controller is configured to:
when the accelerator is actuated by a maximum actuation amount and the brake actuator is not actuated, cause the electric motor to be driven to operate up to a first maximum rotational speed; and
when the accelerator is actuated by the maximum actuation amount and the brake actuator is concurrently actuated, cause the electric motor to operate up to a second maximum rotational speed lower than the first maximum rotational speed.

19. A method of operating an electric powersport vehicle, the method comprising:
receiving an accelerator command via an accelerator actuatable by an operator of the electric powersport vehicle;

when the accelerator command exists at a different time as a braking command received via a brake actuator actuatable by the operator of the electric powersport vehicle:
   driving an electric motor configured to propel the electric powersport vehicle to produce a first non-zero output torque based on the accelerator command; and
   limiting the first non-zero output torque to a first maximum output torque;
when the accelerator command exists at a same time as the braking command:
   driving the electric motor configured to propel the electric powersport vehicle to produce a second non-zero output torque based on the accelerator command; and
   limiting the second non-zero output torque to a second maximum output torque lower than the first maximum output torque.

20. The method as defined in claim 19, wherein:
when the accelerator command is indicative of a requested output torque from the electric motor lower than the second maximum output torque, the first non-zero output torque is substantially equal to the second non-zero output torque; and
when the accelerator command is indicative of a requested output torque from the electric motor greater than the second maximum output torque, the second non-zero output torque is lower than the second non-zero output torque.

* * * * *